(12) United States Patent
Hoeksma

(10) Patent No.: US 6,175,353 B1
(45) Date of Patent: *Jan. 16, 2001

(54) DISPLAY APPARATUS

(75) Inventor: Henry Hoeksma, Kinburn (CA)

(73) Assignee: Nortel Networks Limited, Montreal (CA)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/233,117

(22) Filed: Jan. 19, 1999

Related U.S. Application Data

(63) Continuation of application No. 08/817,000, filed on Mar. 14, 1997, now Pat. No. 5,894,298.

(51) Int. Cl.[7] ............................................. G09G 3/36
(52) U.S. Cl. ............................................. 345/102
(58) Field of Search ............................. 345/102, 76, 207, 345/77, 78, 79, 80

(56) References Cited

U.S. PATENT DOCUMENTS

| | | |
|---|---|---|
| 4,904,991 | 2/1990 | Jones . |
| 5,065,357 | 11/1991 | Shiraishi et al. . |
| 5,337,073 | 8/1994 | Tsunoda et al. . |
| 5,337,353 | 8/1994 | Boie et al. . |
| 5,398,022 | 3/1995 | Lipp . |
| 5,406,305 | 4/1995 | Shimomura et al. . |
| 5,485,172 | 1/1996 | Sawachika et al. . |
| 5,684,294 | 11/1997 | Kouchi . |
| 5,694,142 | * 12/1997 | Dumoulin et al. ................ 345/9 |
| 5,767,842 | * 6/1998 | Korth ................................ 345/168 |
| 5,933,089 | * 8/1999 | Katada ............................... 345/102 |

* cited by examiner

Primary Examiner—Richard A. Hjerpe
Assistant Examiner—Ronald Laneau
(74) Attorney, Agent, or Firm—Dennis R. Haszko

(57) ABSTRACT

An alphanumeric, and graphics liquid crystal display having utility in portable devices used in communications, measurement, and data display systems generally, is disclosed in the environment of a wireless telephone handset. The display includes a transparent viewing screen having a reflective substrate adapted to display thereon transitory opaque symbols in response to data signals received during a telephone call or generated at a keypad of the handset when a call is placed. Positioned under the substrate, an illumination screen has selectable elements which are illuminated in response to control signals generated in correspondence with the data signals. Being in registry with portions of the substrate on which the symbols are displayed, the selected elements of the illumination screen provide backlighting for viewing the symbols under low ambient light levels without illuminating the entire viewing screen, thereby conserving power in an on-board battery.

18 Claims, 4 Drawing Sheets

DISPLAY APPARATUS

This application is a continuation of co-pending application Ser. No. 08/817,000 filed Mar. 14, 1997, now U.S. Pat. No. 5,894,298.

FIELD OF THE INVENTION

This invention relates to display apparatus generally and, in particular, to such apparatus having an illuminated background against which displayed alphanumeric characters, and graphics symbols are viewed.

BACKGROUND OF THE INVENTION

A plentitude of battery powered, hand-held solid state devices are provided with display screens adapted for specialized applications. Examples of such devices include, computers, distance measuring devices, navigational instruments, paging devices, and communications devices generally, including telephone handsets adapted to receive e-mail. This list is not exhaustive, but serves to illustrate the utilitarian nature of alphanumeric, and graphics display screens which are essential where an alphanumeric data or graphics readout is required.

Under conditions of sufficient ambient light level, these screens perform adequately. At low level light conditions, however, illumination is required to read the data carried by the screen. Where an external power source provides operating current for the device, screen illumination is not generally a problem. However where the device relies on a self-contained source of battery power, illumination becomes problematic since the current requirements of illumination components generally impose a substantial current drain from the battery. Light emitting diodes (LEDs) are particularly notorious in this regard. Power conservation in battery powered devices of the type described is therefore a major concern for equipment designers and users alike.

SUMMARY OF THE INVENTION

Having regard to the aforedescribed problem associated with battery power conservation, a principal provision of the present invention is display apparatus having a controllable illumination screen against which opaque symbols formed on a transparent reflective viewing screen can be viewed.

Another provision of the invention is display apparatus in which the illumination screen is adapted to be energized selectively so that only discrete portions provide illumination for viewing corresponding portions of the viewing screen, and its opaque symbols.

The above-mentioned provisions effectively create a selective energization for controlling the illumination means against which the symbols on the substrate can be viewed. For clarity of terminology, the portion of the illumination means being under selective energization control will be referenced herein as a controllably variable area.

Yet another provision of the invention is display apparatus having a positionable cover for covering portions of the screen that are not viewed, and circuit means responsive to the cover position that restorably inhibit illumination of a covered screen portion.

A still further provision of the invention is display apparatus that embodies sensing devices to extinguish any and all illuminated regions of the illumination screen in the absence of data on the viewing screen, when ambient light levels are high, or when the apparatus is placed within a predetermined distance to a user, notably when a telephone handset is moved from a read position to a talk and listen position alongside a user's face.

The problems associated with the prior art may be substantially overcome, and the foregoing provisions achieved by recourse to one aspect of the invention which relates to display apparatus that comprises, in combination, a transparent viewing screen having a reflective substrate adapted to form transitory opaque symbols thereon in response to respective ones of input data signals, means for applying the data signals to selected portions of the substrate, illumination means disposed in registry with the screen for backlighting the substrate in response to respective ones of input control signals, and control means coupled with the illumination means for applying the control signals thereto to illuminate the controllably variable area, of the illumination means against which the symbols on the substrate can be viewed.

Another aspect of the invention is a method for viewing a transparent screen having a reflective substrate adapted to form transitory opaque symbols thereon in response to respective ones of input data signals, and illumination means positioned in registry with the screen for backlighting a predetermined portion of the substrate in response to respective ones of control signals input to the illumination means, the method comprising the steps of generating the control signals in coincidence with the data signals, applying the data signals to selected portions of the substrate, and applying the control signals to the illumination means concurrently with the data signals at the substrate for illuminating the controllably variable area of illumination of the illumination means against which corresponding ones of the symbols on the substrate can be viewed.

A further aspect of the invention is a method for viewing a transparent screen having a reflective substrate adapted to form transitory opaque symbols thereon in response to respective ones of input data signals, and segmented illumination means positioned in registry with the screen for backlighting a predetermined portion of the substrate in response to respective ones of control signals input to the illumination means, the method comprising the steps of generating the control signals, applying the data signals to selected portions of the substrate, and applying the control signals to the illumination means for illuminating a predetermined segment thereof comprising the controllably variable area of illumination against which the symbols on the substrate can be viewed.

BRIEF DESCRIPTION OF THE DRAWINGS

The invention will now be more particularly described with reference to embodiments thereof shown, by way of example, in the accompanying drawings in which.

DETAILED DESCRIPTION OF THE PREFERRED EMBODIMENTS

Figure 1:
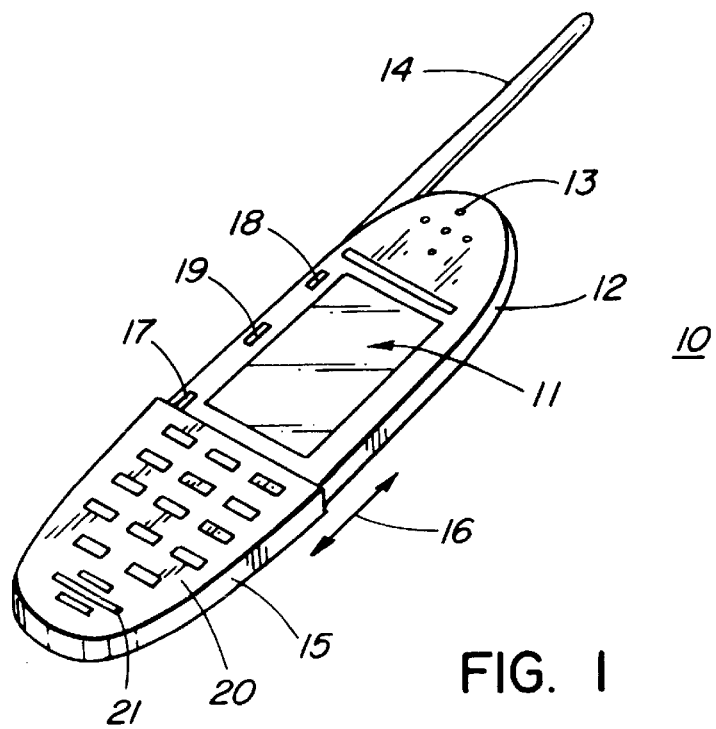
FIG. 1 is a perspective view of a wireless telephone handset embodying display apparatus in accordance with the present invention.

A perspective view of a personal communications device is illustrated in FIG. 1 as a wireless telephone handset 10 utilizing a liquid crystal display (LCD) 11 in accordance with the present invention. It will be observed that the display 11 is positioned centrally within a body 12 having a telephone receiver 13 at one end, and an antenna 14 positioned alongside the body adjacent the receiver.

A cover 15 is disposed on the opposite end of the body 12, and is slidably positionable along the body in a manner to cover, and uncover selected portions of the display 11. A bidirectional sliding relationship between the cover 15, and the body 12 is indicated by a double-headed arrow 16.

Two miniature mechanical microswitches 17, and 18, of a type known in the art, are mounted on the body 12 alongside the display 11 in predetermined relation with the cover 15 as will be described in greater detail hereinbelow.

The cover 15 functions not only as a dust, and protective component for the display 11, but also serves as a carrier and housing for a keypad 20, and a microphone 21 as shown. Although not illustrated, it will be understood that the cover 15 includes a protrusion for activating, i.e., tripping, the switches 17, and 18 at predetermined points along its direction of travel.

Figure 2:
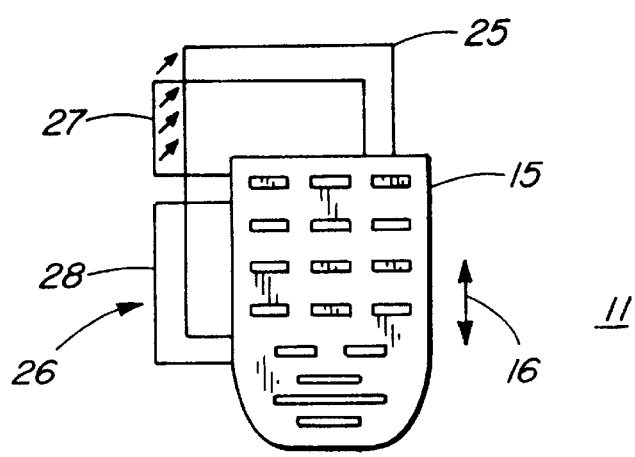
FIG. 2 is a schematic diagram indicating the relative positions of viewing, and backlight screens, and an opaque slidable cover utilized in the handset of FIG. 1.

The relationship between the display 11, and cover 15 is shown diagrammatically in FIG. 2 in its simplest form. It will be apparent therefrom that as the cover 15 is displaced along its direction of travel, it overlies more or less of the display 11. A spring-tensioned detent 19 (FIG. 1) of a known design is disposed on the body 12 between the switches, and engages cooperatively with the aforementioned cover protrusion to releasably hold the cover open approximately mid-way of its travel.

It will be understood from FIG. 2, that the display 11 comprises a transparent reflective substrate which functions as a viewing screen 25 in registry with, and overlying a backlight illumination screen 26. Although the screen 26 is shown in two parts for illustrative purposes as a first backlight segment 27, and a larger second backlight segment 28, it could readily be fabricated as a unitary structure.

A major consumer of power from an on-board battery (not shown) that powers the handset 10, and its circuits, are the segments 27 and 28 which permit viewing the screen 25 during periods of low level ambient light. A significant feature of the embodiments herein described, permits such screen viewing while maximising battery service life.

A detailed block diagram of a circuit 29 (FIG. 3) utilized in the handset 10 shows that data appearing on the display 11 has its origin in several sources. One source is from the keypad 20 when a telephone call is placed. Thus, a telephone directory number entered by the keys is first displayed to the caller for confirmation before transmitting the number via a transceiver 30, and its antenna 14, to a local telephone central office or relay station. A second source is service data, and graphics, received by the transceiver 30 from the central office or relay station, which is viewed on the display 11 during call reception. Additionally, the screen 25, shown in FIG. 3 as a known touch-sensitive screen displaying easily understood prompts, and responding to a writing stylus, provides another data input source via a screen interface 31. The microphone 21 may also be utilized in handsfree dialing, employing suitable known software, whereby spoken commands could invoke dialing a directory number, for example, of anyone listed in a personal directory stored digitally in memory at the handset 10.

Data, including graphics, from at least one of the aforenoted sources is received at a microprocessor 32 via an I/O register 33 and is coupled therefrom to a central processing unit (CPU) 34. Under control of an operating program stored digitally in a read-only memory (ROM) 35, the CPU 34 produces two outputs. A first output is coupled to an input of a backlight controller 36 that functions to enable and illuminate predetermined segments of the backlight screen 26 which represent the controllably variable area of illumination. In this regard, another input to the register 33 is from a switch engagement detector 35 that senses activation of the switches 17, and 18 by the cover 15. An output from the detector 35 is coupled to the CPU 34 via the register 33, and is recognized as either a blanking or illumination signal that results in an output to the controller 36 which correspondingly disables or enables either one or both of the segments 27, and 28 depending upon the position of the cover 15.

In keeping with the objectives of the invention, a proximity detector 37 is employed to sense the placement of the handset 10 against a user's face during a call in progress. In this position the screen 25 would not be visible to the user, so that both segments 27, and 28 may be blanked. The detector 37 thus outputs a signal to an input port of the register 33 which is then applied to the CPU 34 to control the controller 36 in restorably disabling both segments 27, and 28. A suitable detector 37 is disclosed in pending U.S. patent application entitled, Safety Switch for Communication Device, filed Mar. 14, 1996 under Ser. No. 08/615,908 in the name of André Van Schyndel, and assigned to the same assignee as in the present application. The disclosure of Van Schyndel is incorporated herein by reference.

A light level detector 38 also functions to disable the segments 27, and 28 when a backlight is not required. This situation arises under normal light levels when the opaque symbols appearing on the screen 25 are readily observable without backlight illumination. The detector 38 is thus set to respond to a predetermined light level so that ambient illumination of adequate intensity results in an output signal to an input port of the register 33. An output therefrom is coupled to the CPU 34 which signals the controller 36 to generate a disabling or blanking signal that is applied to the screen 26.

A second output from the CPU 34 is applied to a liquid crystal display (LCD) driver 39 that activates predetermined portions of the screen 25 on which corresponding opaque symbols are formed. It will be understood that the opaque symbols are in overlying registry with the illuminated portions of the screen 26, against which the symbols are viewed under low light level conditions.

Typically, the microprocessor 32 includes timing means, shown as a clock 40, and a random access memory (RAM) 41 utilized in processing data received at the CPU 34 from the register 33. Additionally, a programmable read-only memory (PROM) 42 functions in a known manner to store digitally a personal directory for frequently called numbers.

Figure 4:
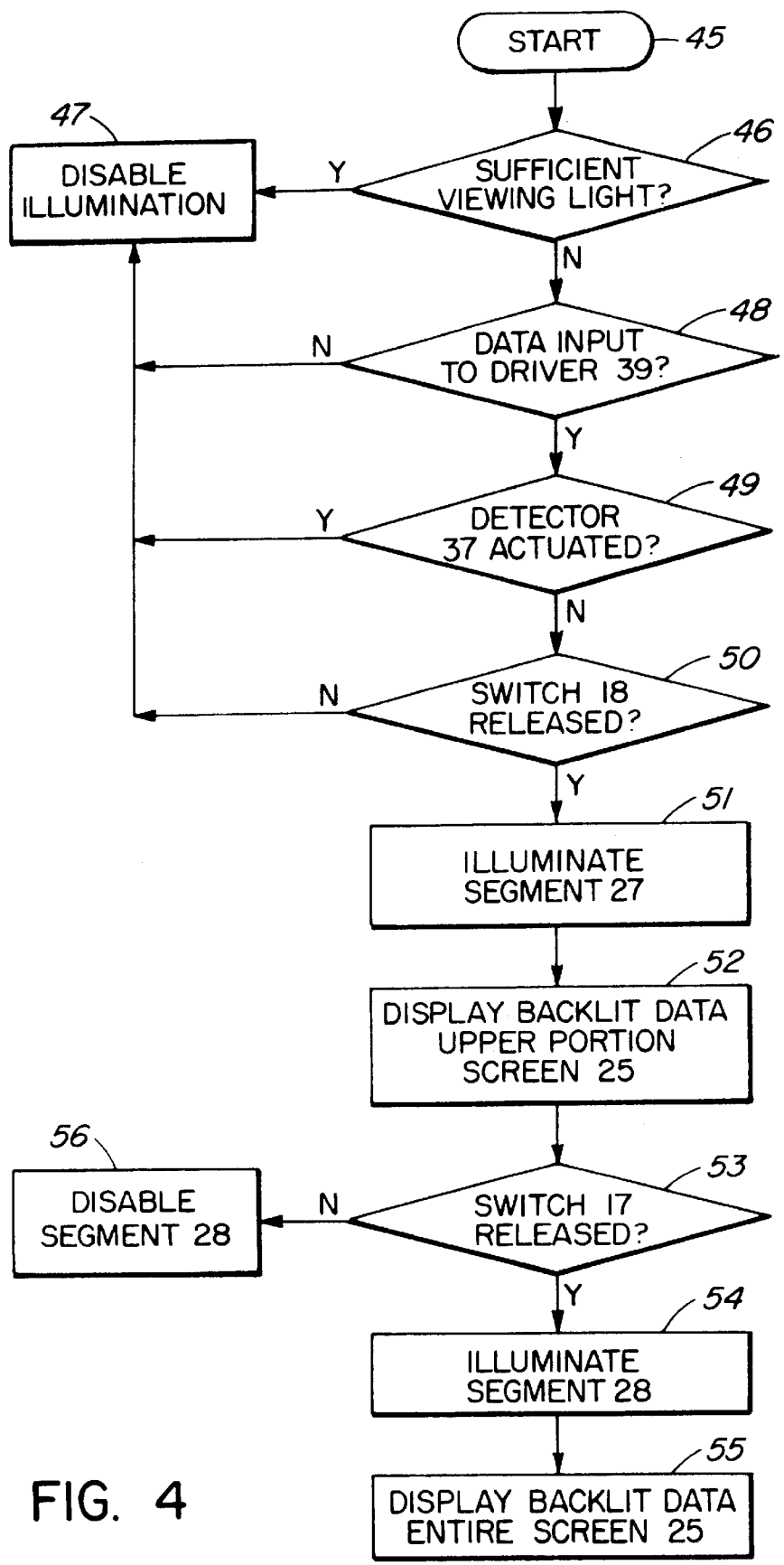
FIG. 4 is a flowchart illustrating an algorithm of an operating program stored digitally in a read-only memory of the circuit in FIG. 3 for enabling the display apparatus of FIG. 1.

One embodiment of the invention is defined by an operating program developed from an algorithm illustrated in the flowchart of FIG. 4 and stored digitally in the ROM 35 for enabling the CPU 34. In this embodiment, illumination of the screen 26 is effected by means of individual ones of the segments 27, and 28. Reduced efficiency may be expected, however, inasmuch as an entire segment is illuminated at one time, even though only a portion of that segment may be required to backlight data carried by the screen 25.

Reference to FIG. 4 reveals a start block 45 from which the algorithm proceeds to a decision block 46 at which it is determined if there is sufficient viewing light for the screen 25. Under adequate light conditions, screen 26 illumination is disabled (block 47) by the controller 36 in response to a signal from the CPU 34, triggered by the output from the detector 38 as described.

When light level is insufficient, a following test in block 48 determines if screen data has been coupled to the driver 39. A negative result confirms disabling screen 26 illumination, whereas an affirmative conclusion results in a test at block 49 to determine if the detector 37 has been activated due to close proximity of the handset to a user's face. A positive result confirms disabling screen 26 illumination, but a negative response leads to a subsequent test in block 50 to ascertain the condition of the switch 18. If the switch 18 is not released from activation by the protrusion of the cover 15, the screen 26 remains disabled since the cover is understood to be closed. However, a released switch 18 means that the cover 15 is at least partially open. Consequently, the segment 27 is enabled for backlighting the upper portion of the screen 25 as indicated in block 51. Backlit data displayed on the screen 25 is shown in block 52.

A following test in block 53 determines if the switch 17 has been released from activation by the cover 15. If released, the segment 28 is illuminated (block 54) to backlight the lower portion of the screen 25, thereby completely illuminating the screen 25. Block 55 shows data being displayed on the backlit screen 25. An activated switch 17, however, results in the segment 28 being disabled according to block 56.

Depending upon the position of the cover 15 with respect to the switches, the screen 25 may be either partially or entirely backlit by the segments 27 and 28. Thus, if the switches 17, and 18 are sequentially actuated by the cover 15, the screen 25 is completely covered. Both segments 27, and 28 are consequently disabled to conserve battery power. Conversely, when the switch 18 is released, this indicates that the upper portion of the screen 25 is uncovered. Accordingly, the segment 27 is enabled as described to provide backlighting for alphanumeric data, and graphics appearing on the corresponding upper portion of the screen 25. Since, however, the segment 27 of the present embodiment is smaller in area than the segment 28, data accommodated by the upper portion of the screen 25 will be reduced in scope. The smaller segment 27 thus functions to provide adequate backlighting under low level ambient light conditions while conserving battery power for short messages, graphics, and the like which require only a portion of the screen 25.

When a message sequence or graphics display is greater in size than can be accommodated by the uncovered upper portion of the screen 25, the switch 17 is released, and the cover 15 is then in its most extended position as illustrated in FIG. 1. It would be apparent to the user to slide the cover 15 to its most extended position to view either a long message or other alphanumeric data or graphics information which require greater screen space than that provided by the screen 25 when backlit by the segment 27. In this event, both segments 27 and 28 are energized to backlight the entire screen 25.

Figure 3:
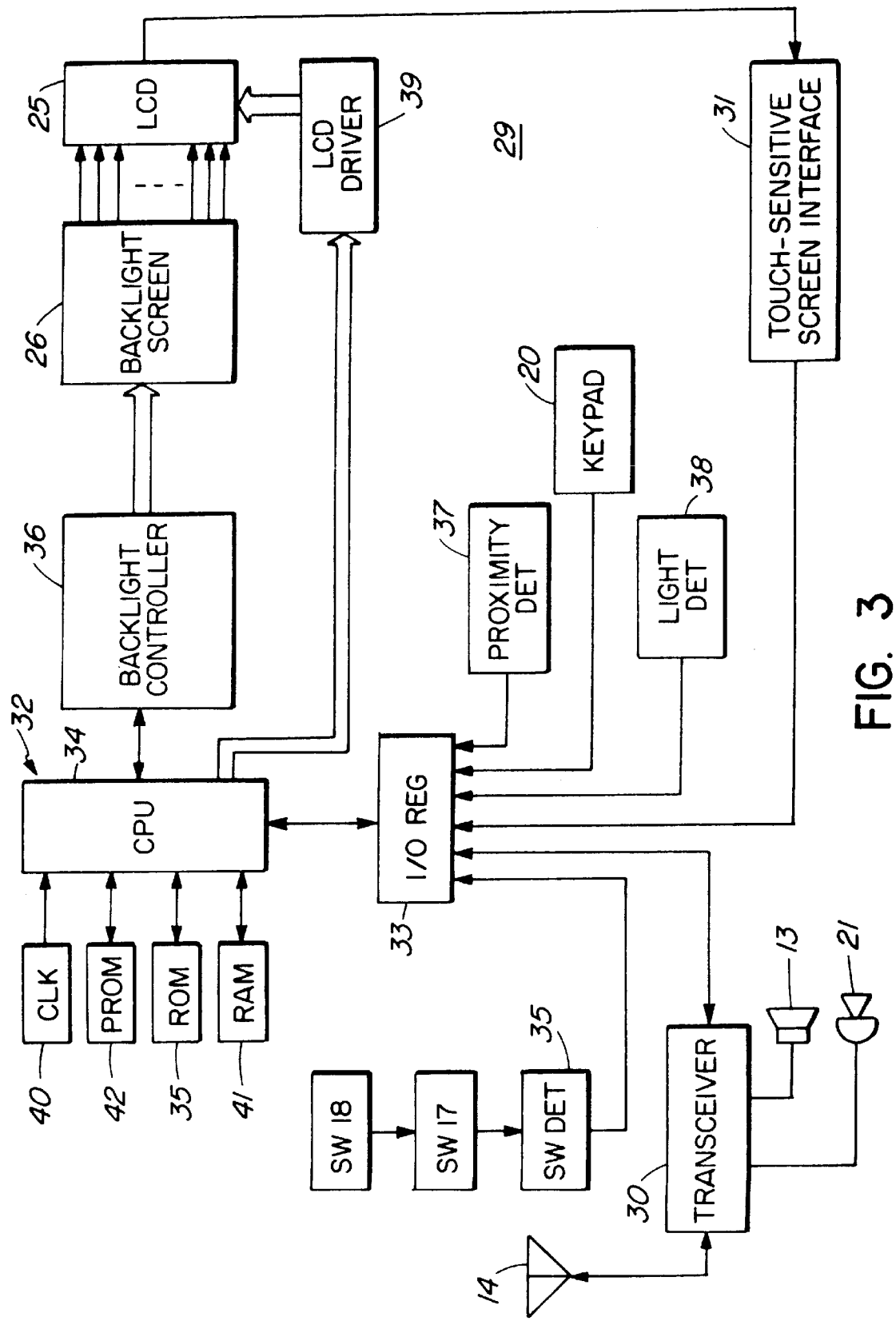
FIG. 3 is a block diagram of a circuit utilized in the display apparatus of FIG. 1.
Figure 5:
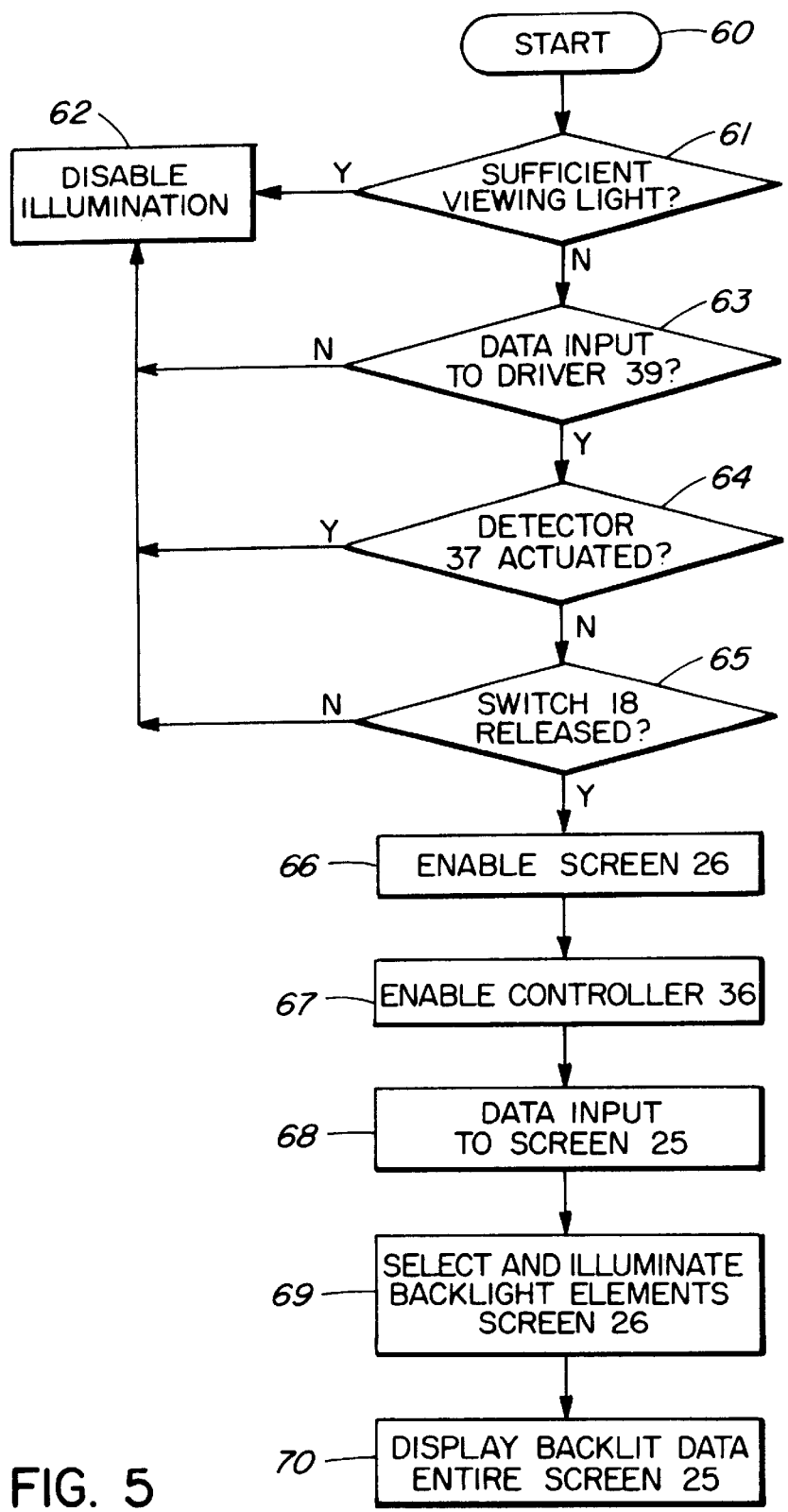
FIG. 5 is a flowchart illustrating an algorithm of an enhanced operating program stored digitally in a read-only memory of the circuit in FIG. 3 for enabling the display apparatus of FIG. 1.

FIG. 5 is a flowchart illustrating an algorithm of an enhanced operating program stored digitally in the ROM 35 for enabling the CPU 34 to give effect to a preferred operating mode of the circuit 29 in FIG. 3. This embodiment provides dynamic control of the screen 25, together with the screen 26, such that only individual ones of opaque symbols, or characters, formed on the screen 25 are selectively illuminated with backlight. In this manner the objective of the invention to maximize the service life of an on-board battery is most effectively achieved.

Having regard to FIG. 5, it will be observed that the algorithm of blocks 60–66 corresponds substantially with the algorithm of blocks 45–51 in FIG. 4. Divergence begins, however, in block 67 of FIG. 5 at which the controller 36 is enabled by the CPU 34 to configure the screen 26 for illuminating predetermined discrete elements thereof which constitute the controllably variable area of illumination. This is followed by block 68 at which screen data is output from the driver 39 to the screen 25. Control signals output from the CPU 34 to the controller 36 are generated by the CPU in coincidence with corresponding data signals that are coupled to the driver 39. Resulting drive signals output from the controller 36 to the screen 26, and corresponding data signals output from the driver 39 to the screen 25, are therefore applied to their respective screens concurrently, and in registration. Elements of the screen 25 that form the transitory opaque symbols, which correspond to individual ones of the data, are consequently backlit by corresponding illumination elements of the screen 26 via the controller 36 in accordance with block 69. It will be understood that the condition of the switch 17 is immaterial in the preferred operating mode of the circuit 29 in view of the one-on-one relationship between data and its backlighting. Accordingly, the switch 17 is not used, and the algorithm proceeds to block 70 where all backlit data are displayed on the screen 25.

The embodiments of the present invention rely on a block diagram to describe various elements and their respective functions in the circuit 29 which is programmable to define individually the embodiments disclosed. Although program listings have not been included to disclose the precise manner of digital computer programming to perform the operations desired, the detailed functional descriptions presented herein, together with related flowcharts, would permit a skilled computer programmer to program the CPU 34 to perform all required operations.

Accordingly, the foregoing constitutes a sufficient description to such individuals for a comprehensive understanding of the best mode contemplated to give effect to the embodiments as disclosed and claimed herein.

To those skilled in the art to whom this specification is addressed, it will be apparent that the embodiments aforedescribed may be varied to meet particular specialized requirements without departing from the true spirit and scope of the invention disclosed. For example, although the invention is described in the context of a wireless telephone handset 10, the invention may be readily applied to any one of the aforementioned solid state devices having a display screen. Furthermore, the mechanical microswitches 17, and 18 may be replaced with reed switches that are activated by a magnetic element disposed within the cover 15 instead of the aforementioned protuberance. Alternatively, the reed switches could be replaced with solid state magnetic flux detectors. The foregoing embodiments are therefore not to be taken as indicative of the limits of the invention, but rather as exemplary structures thereof which are described by the claims appended hereto.

The embodiments of the invention in which an exclusive property or privilege is claimed are defined as follows:

1. Display apparatus, comprising in combination:
   a transparent viewing screen having a reflective substrate adapted to form transitory opaque symbols thereon in response to respective ones of input data signals;
   means for applying the data signals to selected portions of the substrate;
   illumination means disposed in registry with the screen for backlighting the substrate in response to respective ones of input control signals; and
   control means coupled with the illumination means for applying the control signals thereto to illuminate a controllably variable area of the illumination means against which the symbols on the substrate can be viewed.

2. Display apparatus as claimed in claim 1, further comprising:
   means for detecting the presence of data signals applied to the substrate, and generating a first blanking signal in the absence thereof; and
   means for coupling the first blanking signal to the control means for restorably disabling operation of the illumination means.

3. Display apparatus as claimed in claim 2, further comprising:
   light detection means for detecting ambient light intensity, and generating a second blanking signal when the light intensity exceeds a predetermined value; and
   means for coupling the second blanking signal to the control means for restorably disabling operation of the illumination means.

4. Display apparatus as claimed in claim 3, further comprising:
   proximity detection means for detecting a spatial separation between the apparatus and a user thereof, and generating a third blanking signal the separation distance is less than a predetermined value,
   means for coupling the third blanking signal to the control means for restorably disabling operation of the illumination means.

5. Display apparatus as claimed in claim 4, further comprising:
   a cover positionable over the screen for covering an inactive portion thereof, and
   sensing means for ascertaining the position of the cover with respect to the screen.

6. Display apparatus as claimed in claim 5, further comprising:
   actuating means disposed within the cover for activating the sensing means when the cover is positioned in covering relation with the screen, and deactivating the sensing means when predetermined portions of the screen are uncovered.

7. Display apparatus as claimed in claim 6, wherein the sensing means includes at least one switch and a detector connected thereto for generating an output control signal corresponding to the sensed cover position.

8. Display apparatus as claimed in claim 7, wherein the control means comprise:
   an input/output register having a plurality of input ports connected to corresponding ones of the switch detector, proximity detection means, ambient light detection means, and a source of data signals; and
   a microprocessor coupled to an output port of the register for receiving the control, blanking, and data signals therefrom for selectively enabling and disabling the selected portions of the substrate along with the controllably variable area of the illumination means.

9. Display apparatus as claimed in claim 8, further comprising:
   means for generating illumination control signals in coincidence with the data signals; and
   means for applying the illumination control signals to the illumination means for illuminating discrete predetermined portions thereof comprising the controllably variable area against which corresponding ones of the symbols on the substrate can be viewed.

10. Display apparatus as claimed in claim 6, wherein the actuating means includes a magnet, and the sensing means includes a magnetic flux detector for generating an output control signal corresponding to the sensed cover position.

11. A method for viewing a transparent screen having a reflective substrate adapted to form transitory opaque symbols thereon in response to respective ones of input data signals, and illumination means positioned in registry with the screen for backlighting a predetermined portion of the substrate in response to respective ones of control signals input to the illumination means, comprising the steps of:
    generating the control signals in coincidence with the data signals;
    applying the data signals to selected portions of the substrate; and
    applying the control signals to the illumination means concurrently with the data signals at the substrate for illuminating a controllably variable area of the illumination means against which corresponding ones of the symbols on the substrate can be viewed.

12. A method as claimed in claim 11, comprising the prior steps of:
    testing for the presence of data signals applied to the substrate; and
    restorably disabling the illumination means in the absence of the data signals.

13. A method as claimed in claim 12, comprising the prior steps of:
    testing for the presence of sufficient ambient light for viewing the screen; and
    restorably disabling the illumination means in the presence of sufficient ambient light.

14. A method as claimed in claim 13, comprising the prior steps of:
    detecting a spatial separation between the screen and a user thereof; and
    restorably disabling the illumination means when the separation distance is less than a predetermined value.

15. A method for viewing a transparent screen having a reflective substrate adapted to form transitory opaque symbols thereon in response to respective ones of input data signals, and segmented illumination means positioned in registry with the screen for backlighting a predetermined portion of the substrate in response to respective ones of control signals input to the illumination means, comprising the steps of:
    generating the control signals;
    applying the data signals to selected portions of the substrate; and
    applying the control signals to the illumination means for illuminating a predetermined segment thereof comprising a controllably variable area of illumination against which the symbols on the substrate can be viewed.

16. A method as claimed in claim 15, comprising the prior steps of:
   testing for the presence of data signals applied to the substrate; and
   restorably disabling the illumination means in the absence of the data signals.

17. A method as claimed in claim 16, comprising the prior steps of:
   testing for the presence of sufficient ambient light for viewing the screen; and
   restorably disabling the illumination means in the presence of sufficient ambient light.

18. A method as claimed in claim 17, comprising the prior steps of:
   detecting a spatial separation between the screen and a user thereof; and
   restorably disabling the illumination means when the separation distance is less than a predetermined value.

* * * * *